(12) United States Patent
Guarr et al.

(10) Patent No.: US 6,606,184 B2
(45) Date of Patent: *Aug. 12, 2003

(54) ELECTRODE DESIGN FOR ELECTROCHROMIC DEVICES

(75) Inventors: Thomas F. Guarr, Holland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/949,361

(22) Filed: Sep. 7, 2001

(65) Prior Publication Data

US 2002/0005977 A1 Jan. 17, 2002

Related U.S. Application Data

(63) Continuation of application No. 09/343,345, filed on Jun. 30, 1999.

(51) Int. Cl.[7] ................................................. G02F 1/15
(52) U.S. Cl. ........................ 359/265; 359/266; 359/268; 359/272; 359/275
(58) Field of Search ................................. 359/265–275

(56) References Cited

U.S. PATENT DOCUMENTS

| | | | |
|---|---|---|---|
| 4,297,401 A | 10/1981 | Chern et al. | 428/1.53 |
| 4,349,818 A | 9/1982 | Kaneko et al. | 345/105 |
| 4,418,102 A | 11/1983 | Ferrato | 428/1.53 |
| 4,695,490 A | 9/1987 | McClelland et al. | 428/1 |
| 4,702,566 A | 10/1987 | Tukude | 359/267 |
| 4,893,908 A | 1/1990 | Wolf et al. | 359/275 |
| 4,902,108 A | 2/1990 | Byker | 359/270 |
| 5,066,111 A | 11/1991 | Singleton et al. | 359/275 |
| 5,124,832 A | 6/1992 | Greenberg et al. | 359/269 |
| 5,128,799 A | 7/1992 | Byker | 359/265 |
| 5,136,419 A | 8/1992 | Shabrang | 359/265 |
| 5,161,048 A | 11/1992 | Rukavina | 359/275 |
| 5,202,787 A | 4/1993 | Byker et al. | 359/267 |
| 5,204,778 A | 4/1993 | Bechtel | 359/604 |
| 5,278,693 A | 1/1994 | Theiste et al. | 359/272 |
| 5,280,380 A | 1/1994 | Byker | 359/265 |
| 5,384,653 A | 1/1995 | Benson et al. | 359/270 |
| 5,657,149 A | 8/1997 | Buffat et al. | 359/275 |
| 5,724,176 A | 3/1998 | Nishikitani et al. | 359/271 |
| 5,889,608 A | 3/1999 | Buffat et al. | 359/273 |
| 6,193,912 B1 | 2/2001 | Theiste et al. | 252/583 |

FOREIGN PATENT DOCUMENTS

| | | |
|---|---|---|
| WO | 9857228 | 12/1998 |

*Primary Examiner*—Evelyn Lester
(74) *Attorney, Agent, or Firm*—Price, Heneveld, Cooper, DeWitt & Litton; Brian J. Rees

(57) ABSTRACT

An electrochromic device, such as a window or mirror, is disclosed that includes first and second substrates each having an inner surface spaced apart from one another to define a chamber, first and second electrodes carried on the inner surface of the second substrate and disposed thereon to be electrically isolated from one another, and an electrochromic medium disposed in the chamber. The electrodes may be disposed on the inner surface of the second substrate in substantially co-planar relation. Alternatively, the electrodes may be arranged in a stacked relation, with a layer of dielectric material provided therebetween.

29 Claims, 6 Drawing Sheets

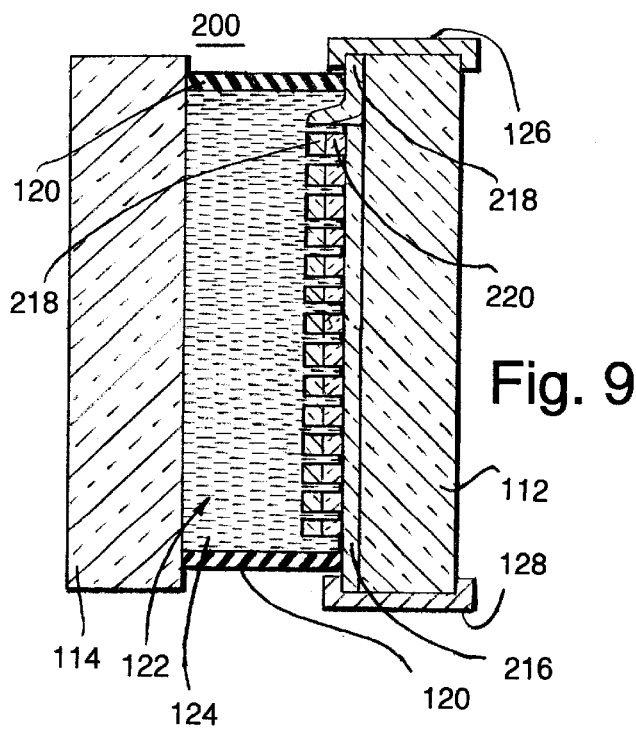
Fig. 9
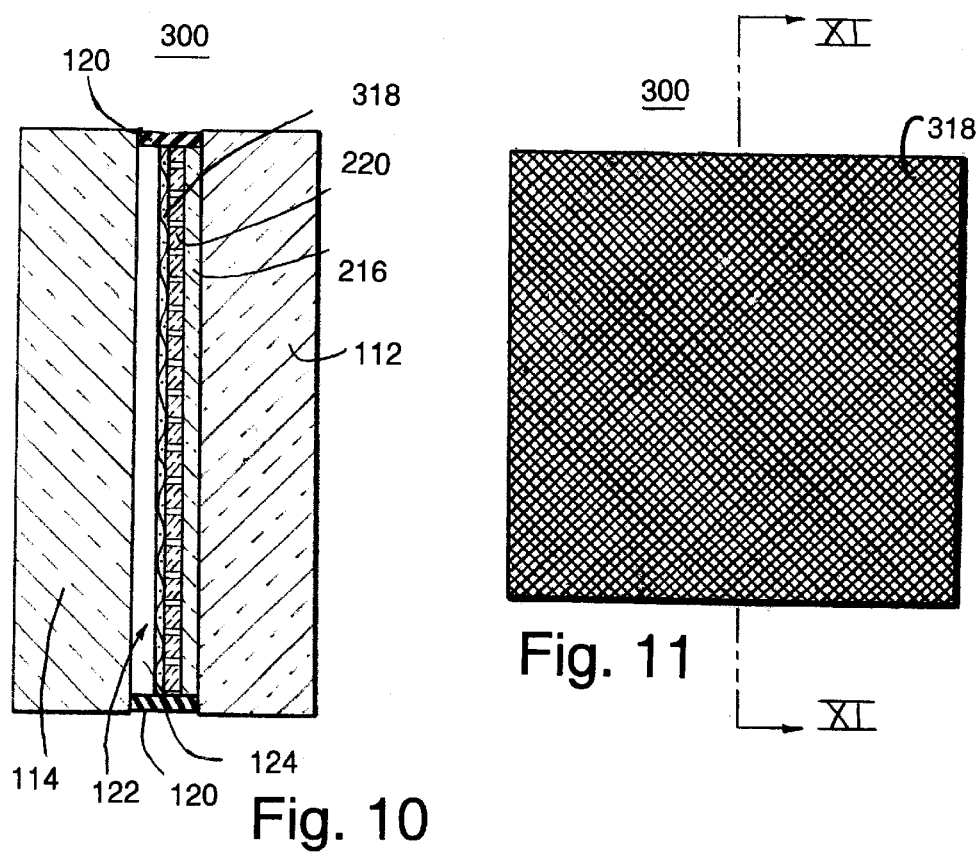
Fig. 10
Fig. 11

Fig. 12A
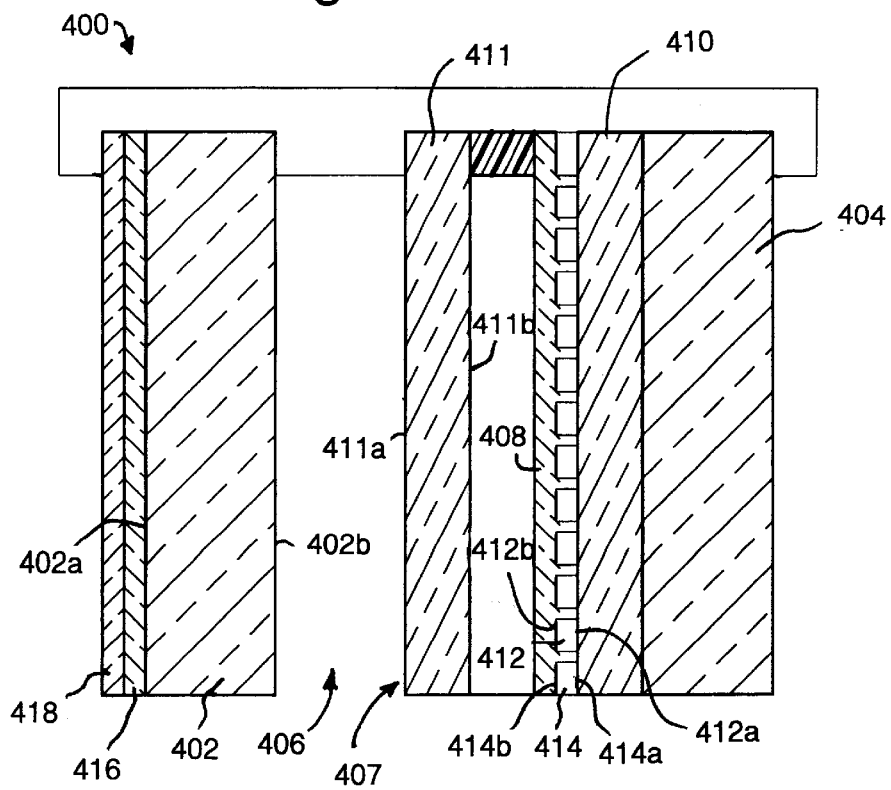
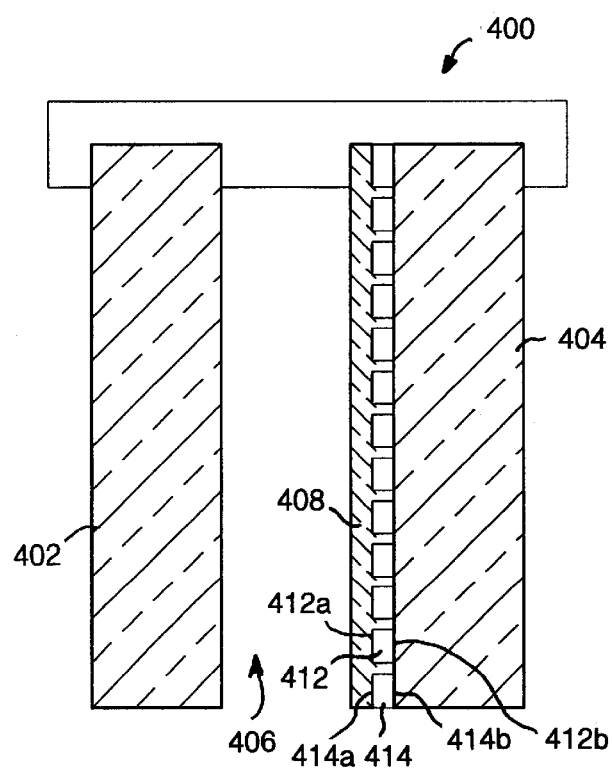
Fig. 12B

ELECTRODE DESIGN FOR ELECTROCHROMIC DEVICES

CROSS-REFERENCE TO RELATED APPLICATIONS

This application is a continuation of U.S. patent application Ser. No. 09/343,345, entitled "ELECTRODE DESIGN FOR ELECTROCHROMIC DEVICES," filed on Jun. 30, 1999, now allowed by, Thomas F. Guarr et al., the entire disclosure of which is incorporated herein by reference.

BACKGROUND OF THE INVENTION

The present invention generally relates to devices of reversibly variable transmittance to electromagnetic radiation. More specifically, the present invention relates to an improved electrode design for electrochromic light filters and mirrors.

Devices of reversibly variable transmittance to electromagnetic radiation have been proposed as the variable transmittance element in variable transmittance light filters, variable reflectance mirrors, and display devices, which employ such light filters or mirrors in conveying information. These variable transmittance light filters have included architectural windows, skylights, and windows and sunroofs for automobiles.

Devices of reversibly variable transmittance to electromagnetic radiation, wherein the transmittance is altered by electrochromic means, are described, for example, by Chang, "Electrochromic and Electrochemichromic Materials and Phenomena," in *Non-emissive Electrooptic Displays*, A. Kmetz and K. von Willisen, eds. Plenum Press, New York, N.Y. 1976, pp. 155–196 (1976) and in various parts of *Electrochromism*, P. M. S. Monk, R. J. Mortimer, D. R. Rosseinsky, VCH Publishers, Inc., New York, N.Y. (1995). Numerous electrochromic devices are known in the art. See, e.g., U.S. Pat. No. 3,451,741 issued to Manos; U.S. Pat. No. 4,090,358 issued to Bredfeldt et al.; U.S. Pat. No. 4,139,276 issued to Clecak et al.; U.S. Pat. No. 3,453,038 issued to Kissa et al.; U.S. Pat. Nos. 3,652,149, 3,774,988, and 3,873,185 issued to Rogers; and U.S. Pat. Nos. 3,282,157, 3,282,158, 3,282,160, and 3,283,656 issued to Jones et al.

In addition to these devices, there are commercially available electrochromic devices and associated circuitry, such as those disclosed in U.S. Pat. No. 4,902,108, entitled "SINGLE-COMPARTMENT, SELF-ERASING, SOLUTION-PHASE ELECTROCHROMIC DEVICES, SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosures of each, including the references contained therein, are hereby incorporated herein in their entirety by reference. Such electrochromic devices may be utilized in a fully integrated inside/outside rearview mirror system for a vehicle or as separate inside or outside rearview mirror systems.

It is desirable to use reversibly variable transmittance light filters in architectural windows, skylights, and in windows and sunroofs for automobiles in order to reduce the transmittance of the filter with respect to direct or reflected sunlight during daytime, while not reducing such transmittance during nighttime. Not only do such light filters reduce bothersome glare and ambient brightness, they also reduce fading and generated heat caused by the transmittance of sunlight through the window.

Variable transmission electrochromic devices such as windows and light filters typically include a structure similar to that shown in FIG. 1. Specifically, they typically include first and second transparent substrates 12 and 14, which are commonly made of glass and arranged in parallel, spaced-apart relation. The electrochromic devices also typically include first and second transparent, electrically conductive layers forming electrodes 16 and 18 provided on the interfacing surfaces of substrates 12 and 14. A seal 20 is provided to secure the coated substrates together and to provide a chamber 22 between the coated substrates in which an electrochromic medium 24 is provided. Electrically conductive clips 26 and 28 are respectively attached to one of the coated substrates so as to be electrically coupled to one of electrode layers 16 and 18. The electrochromic medium 24 is contained in chamber 22. The electrochromic medium 24 is in direct contact with transparent electrode layers 16 and 18, through which passes electromagnetic radiation whose intensity is reversibly modulated in the device by a variable voltage or potential applied to electrode layers 16 and 18 through clip contacts 26 and 28 and an electronic circuit (not shown).

The electrochromic medium 24 includes two different coloring species—a cathodic species and an anodic species, which are colorless or nearly colorless in an inactivated state. In most cases, when there is no electrical potential difference between transparent electrodes 16 and 18, the electrochromic medium 24 in chamber 22 is colorless or nearly colorless, and incoming light ($I_o$) enters through second substrate 14, passes through transparent electrode 18, electrochromic containing chamber 22, transparent electrode 16, and first substrate 12. When a potential difference is applied between transparent electrodes 16 and 18 at the cathode, the cathodic species are reduced (i.e., accept electrons from the cathode). On the other hand, the anodic species are oxidized at the anode (i.e., donate electrons to anode 16). As the cathodic and anodic species in electrochromic medium 24 accept and donate electrons from/to electrodes 18 and 16, respectively, at least one of the species becomes colored. The anodic and cathodic species in medium 24 return to a colorless or nearly colorless state once they exchange electrons in the center portion of chamber 22. Nevertheless, so long as a sufficient potential is applied across electrodes 16 and 18, there is a sufficient amount of the anodic and cathodic species that are oxidized and reduced so as to color an electrochromic cell. Because the anodic and cathodic species exchange electrons in the center portion of chamber 22 and donate and accept electrons when adjacent a respective electrode 16 and 18, the reduced cathodic component contributing to the perceived color exists primarily adjacent cathode 18, and the oxidized anodic component exists proximate to anode 16. This also corresponds to the fact that the concentration of reduced cathodic species is greatest proximate cathode 18, and the concentration of oxidized anodic species is greatest adjacent anode 16.

Commercially available electrochromic media that are suitable for use in chamber 24 generally include solution-phase and solid-state electrochromic materials. In an all solution-phase medium, the electrochemical properties of the solvent, optional inert electrolyte, anodic materials, cathodic materials, and any other components that might be present in the solution are preferably such that no significant electrochemical or other changes occur at a potential difference which oxidizes anodic material and reduces the cathodic material other than the electrochemical oxidation of the anodic material, electrochemical reduction of the cathodic material, and the self-erasing reaction between the oxidized form of the anodic material and the reduced form of the cathodic material.

Electrode layers 16 and 18 are connected to electronic circuitry which is effective to electrically energize the electrochromic medium, such that when a potential is applied across the transparent electrodes 16 and 18, electrochromic medium 24 in chamber 22 darkens, such that incident light ($I_o$) is attenuated as the light passes through the electrochromic device. By adjusting the potential difference between the transparent electrodes, such a device can function as a "gray-scale" device, with continuously variable transmittance over a wide range. For solution-phase electrochromic systems, when the potential between the electrodes is removed or returned to zero, the device spontaneously returns to the same zero-potential, equilibrium color and transmittance as the device had before the potential was applied.

Another common construction for an electrochromic device is shown in FIG. 2. In the construction shown in FIG. 2, the first and second transparent substrates 12 and 14 are arranged in a parallel, spaced-apart relationship in the same manner as the electrochromic device shown in FIG. 1. Also, a seal 20 is provided between substrates 12 and 14 so as to provide a sealed chamber 22 lying therebetween. The electrochromic device shown in FIG. 2 differs from that shown in FIG. 1 in that electrochromic medium 24 is solid-state rather than a solution-phase and is formed within a multi-layer stack, with an electrolyte material layer 30 adjacent electrochromic layer 24 between first and second transparent electrode layers 16 and 18. This stack is carried on the inner surface of one of first and second substrates 12 and 14, with either gas or air surrounding the stack within chamber 22. As will be described further below, the electrochromic device shown in FIG. 2 is susceptible to many of the same problems as the electrochromic device shown in FIG. 1.

Electrochromic devices of the type described above are susceptible to irreversible damage from ultraviolet (UV) radiation when operating in its low transmission state. More specifically, the anodic and cathodic species in electrochromic medium 24 can be adversely and permanently affected by the UV light emitted by the sun when they are in their colored states. When the species are not in their colored states, they are generally not adversely affected by UV radiation. The UV absorption problem has made it impractical to use electrochromic light filters in window applications where it is desired to darken windows during daytime hours. To minimize the adverse impact of UV radiation on the electrochromic medium, UV absorbers are often introduced into the electrochromic medium. These absorbers absorb the UV radiation so as to minimize the amount of UV radiation that is absorbed by the anodic and cathodic species within the electrochromic medium. Such UV radiation absorbers, however, are not as effective when the electrochromic device is darkened, because of the fact that the colored species tend to be concentrated adjacent to anode 16 and cathode 18 and because these colored species thus tend to absorb the UV radiation before the UV absorber can absorb the UV radiation.

An additional problem with implementing electrochromic devices in windows is that the amount of current drawn by the type of electrochromic devices shown in FIGS. 1 and 2 is fairly substantial when the electrochromic devices are in their colored states. Also, color bands, or segregation, is known for devices colored for prolonged periods of time. These problems become very significant when electrochromic light filters are utilized in all the windows of a large building.

Yet another practical problem that arises when utilizing electrochromic light filters in architectural windows as well as other forms of windows is that such electrochromic devices are typically made with a relatively large cell spacing between the substrates in order to obtain uniform color throughout the electrochromic medium. Any variations in the distance between the anode and the cathode layers results in variations in color in the electrochromic medium. Tempered glass substrates are generally not very flat. Thus, when tempered glass is used for substrates 12 and/or 14, the need to create a thick cell in a window becomes more important.

SUMMARY OF THE INVENTION

Accordingly, it is an aspect of the present invention to overcome the above-noted problems associated with implementing an electrochromic device as a variable transmittance light filter. More specifically, it is an aspect of the present invention to provide an electrochromic device that is less susceptible to damage from UV radiation. Another aspect of the present invention is to provide an electrochromic device that draws less operating current. Another aspect of the present invention is to provide an electrochromic device that is less likely to be affected by surface variations in the transparent substrates that define the chamber in which the electrochromic medium is disposed.

To achieve these and other aspects and advantages, the electrochromic device of the present invention comprises a transparent first substrate having an outer surface and an inner surface, a second substrate having an inner surface spaced apart from the inner surface of the first substrate so as to define a chamber therebetween, a first electrode carried on the inner surface of the second substrate, and a second electrode also carried on the inner surface of the second substrate such that the second electrode is electrically isolated from the first electrode. The electrochromic device further includes an electrochromic medium disposed in the chamber id between the inner surface of the first substrate and the inner surface of the second substrate, which carries the first and second electrodes. The first and second electrodes may be disposed on the inner surface of the second substrate so as to be substantially co-planar with one another. Alternatively, the electrodes may be arranged in a stacked configuration, with a layer of dielectric material provided therebetween. In this alternative configuration, the dielectric layer and the second electrode would include a plurality of apertures through which the electrochromic medium may contact the first electrode, which underlies the dielectric and second electrode layers.

To achieve the above and other aspects and advantages, an electrochromic device may further be constructed in accordance with the present invention by having a positive electrode, a negative electrode having a surface area different from the surface area of the positive electrode, and an electrochromic medium including cathodic and anodic species, wherein the ratio of cathodic to anodic species within the electrochromic medium is a function of the ratio of the surface areas of the positive and negative electrodes.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 9 is a cross-sectional view of the second embodiment of the present invention taken along line IX—IX of FIG. 6;

FIG. 10 is a front perspective view of an electrochromic device constructed in accordance with a third embodiment of the present invention;

FIG. 11 is a cross-sectional view of the third embodiment taken along line XI—XI of FIG. 10;

FIG. 12A is a cross-sectional view of an insulated glass unit incorporating an electrochromic device in accordance with one embodiment of the present invention; and FIG. 12B is a cross-sectional view of an insulated glass unit incorporating an electrochromic device in accordance with another embodiment of the present invention.

DETAILED DESCRIPTION OF THE PREFERRED EMBODIMENTS

Electrochromic devices have as a component part an electrochromic medium. Electrochromic devices have been, or can be, used in a variety of applications wherein the transmitted or reflected light can be modulated. Such devices include rearview mirrors, such as are used for vehicles; windows for the exterior of a building, home, or vehicle; skylights for buildings including tubular light filters; windows in office or room partitions; display devices; contrast enhancement filters for displays; light filters for photographic devices and light sensors; and indicators for power cells and batteries.

Figure 3:
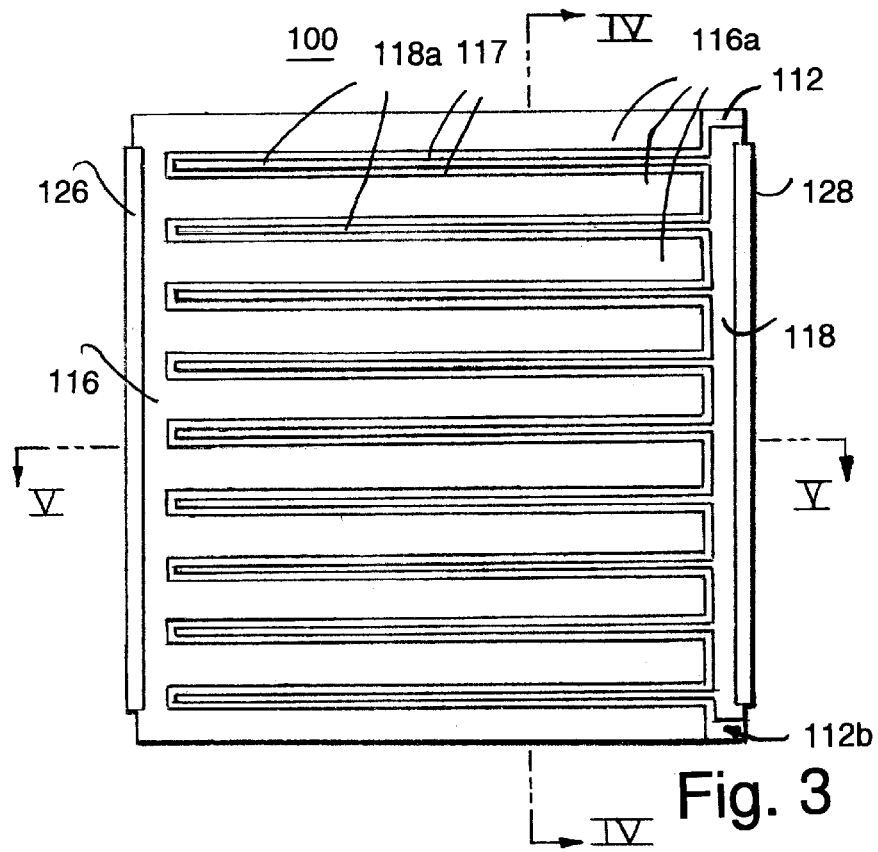
FIG. 3 is a front perspective view of an electrochromic device constructed in accordance with a first embodiment of the present invention.
Figure 4:
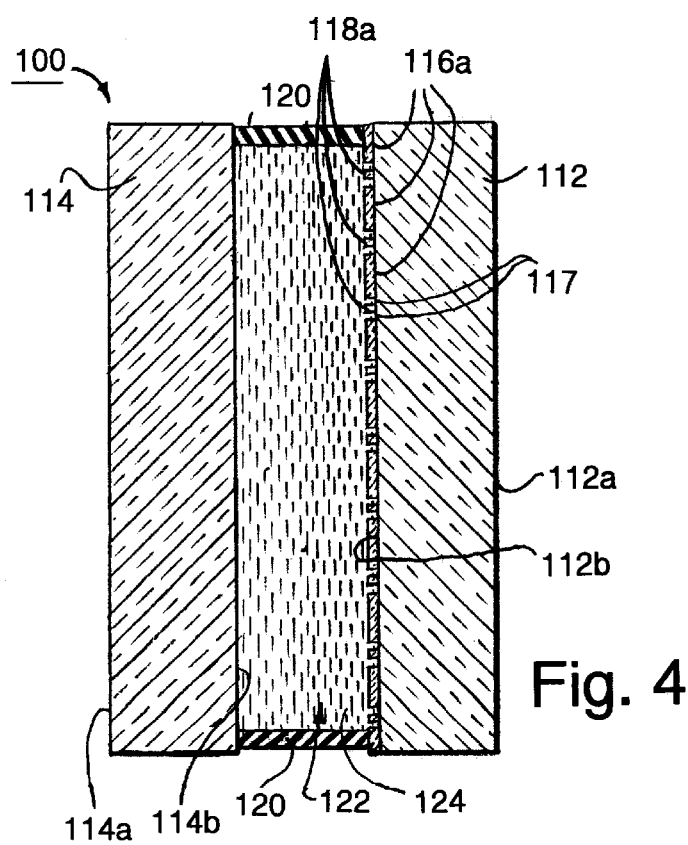
FIG. 4 is a cross-sectional view of the first embodiment of the present invention taken along line IV—IV of FIG. 3.
Figure 5:
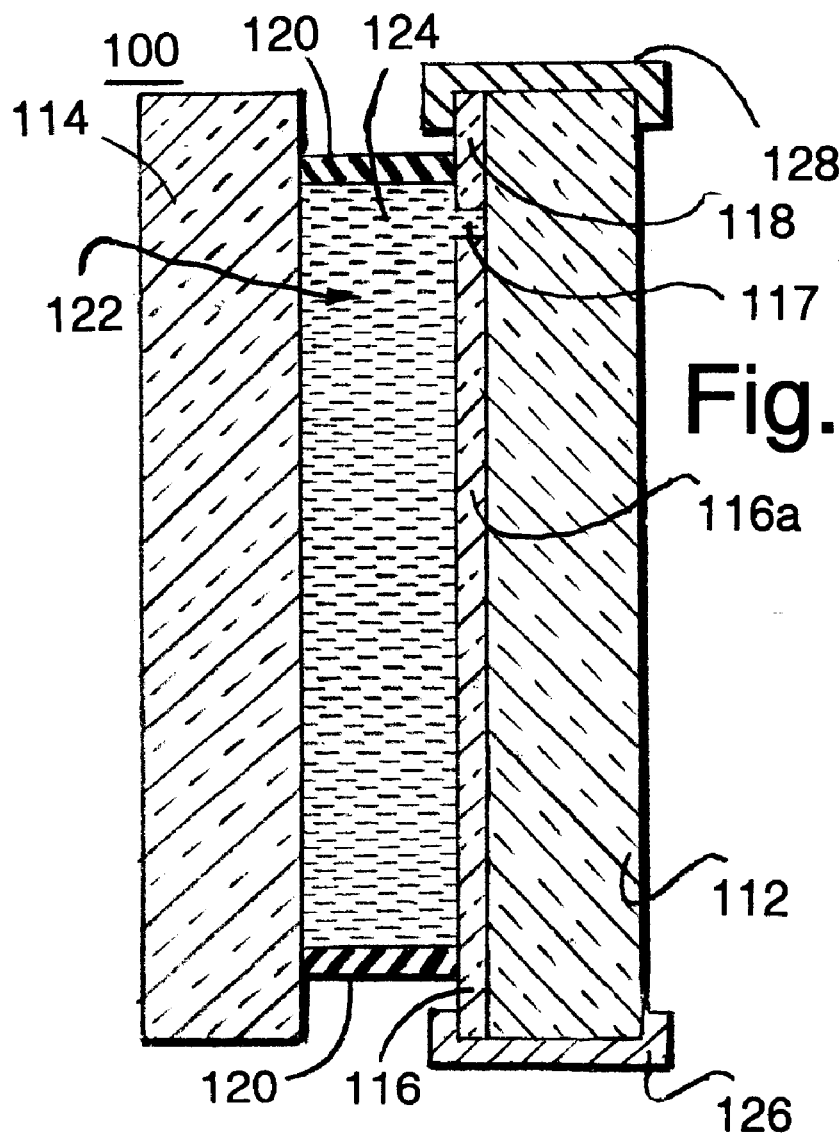
FIG. 5 is a cross-sectional view of the first embodiment of the present invention taken along line V—V of FIG. 3.
Figure 6:
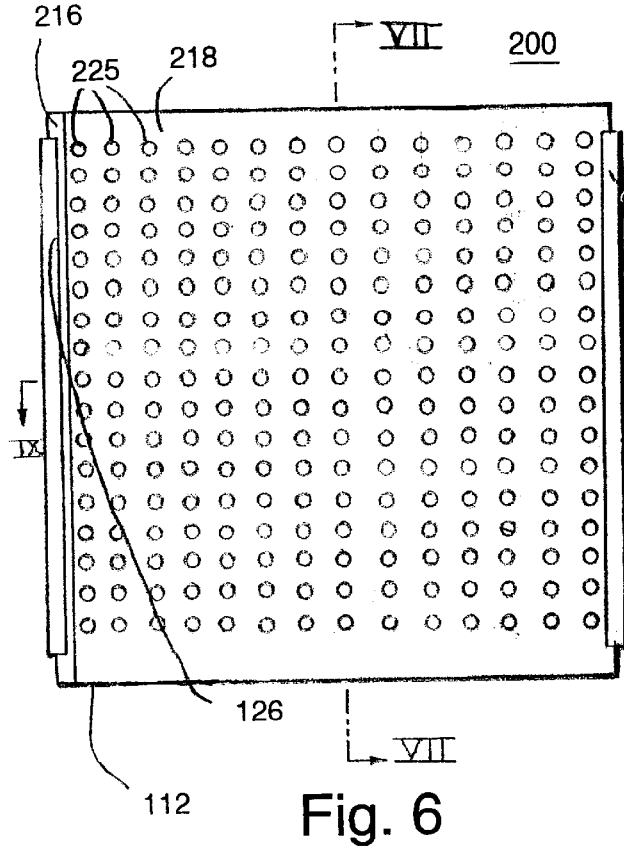
FIG. 6 is a front perspective view of an electrochromic device constructed in accordance with a second embodiment of the present invention.
Figure 7:
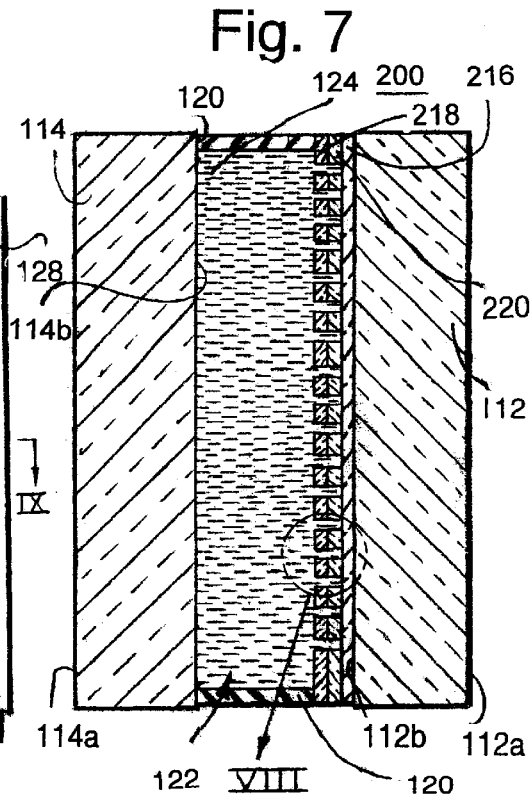
FIG. 7 is a cross-sectional view of the second embodiment of the present invention taken along line VII—VII of FIG. 6.
Figure 8:
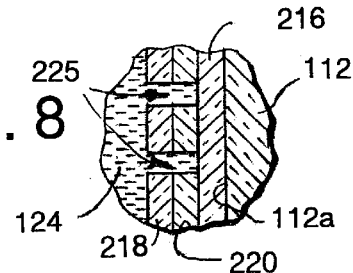
FIG. 8 is an enlarged cross-sectional view of the area of the second embodiment shown in FIG. 7 and designated as VIII—VIII.

An electrochromic device 100 constructed in accordance with a first embodiment of the present invention is shown in FIGS. 3 through 5 (not to scale). Electrochromic device 100 includes a transparent first substrate 114 having an outer surface 114a and an inner surface 114b. Device 100 further includes a second substrate 112 having an inner surface 112b spaced apart from inner surface 114b of first substrate 114. Substrates 112 and 114 are preferably parallel to one another with a seal 120 disposed therebetween to define a chamber 122 between substrates 112 and 114. According to the first embodiment, a first electrode 116 and a second electrode 118 are carried on inner surface 112b of second substrate 112. First and second electrodes 116 and 118 are electrically isolated from one another by a small gap 117. As shown in FIGS. 3 and 4, first and second electrodes 116 and 118 include a plurality of parallel, substantially co-planar, spaced-apart elongated strips (or fingers) 116a and 118a of electrically conductive material that are interdigitatedly disposed on the inner surface of substrate 112.

As used herein to describe the physical relation of the first and second electrodes, the term "substantially co-planar" means that the electrodes lie in a common plane when the surface they are disposed on is planar, and that at least portions of the electrodes lie in a substantially common plane along any given tangent when the surface they are disposed on is non-planar. As also used herein reference to an electrode being "carried on" a substrate or element, means that the electrode is disposed directly or indirectly on the substrate or element.

Electrochromic device 100 includes an electrochromic medium 124 provided within chamber 122. Electrochromic medium 124 includes electrochromic anodic and cathodic materials that can be grouped into the following categories:

Single layer—the electrochromic medium is a single layer of material which may include small nonhomogeneous regions and includes solution-phase devices where a material is contained in solution in the ionically conducting electrolyte and remains in solution in the electrolyte when electrochemically oxidized or reduced. Solution-phase electroactive materials may be contained in the continuous solution-phase of a cross-linked polymer matrix in accordance with the teachings of U.S. Pat. No. 5,928,572, entitled "ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR."

The anodic and cathodic materials can be combined or linked by a bridging unit as described in International Application No. PCT/WO97/EP498 entitled "ELECTRO- CHROMIC SYSTEM." It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES."

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers. It is often desirable in the construction of electrochromic devices to incorporate thinner glass in order to decrease the overall weight of the device so that the mechanisms used to manipulate the orientation of the device are not overloaded. Decreasing the weight of the device also improves the dynamic stability of the device when exposed to vibrations. Electrochromic mirrors incorporating a solution-phase electrochromic medium and two thin glass elements suffer from being flexible and are prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on or about Apr. 2, 1997. The entire disclosure, including the references contained therein, of this U.S. patent is incorporated herein by reference. If a specific color is desired for the electrochromic device, the composition of the electrochromic medium may be appropriately selected in accordance with the teachings of commonly assigned U.S. Pat. No. 6,020,987, entitled "ELECTROCHROMIC MEDIUM CAPABLE OF PRODUCING PRE-SELECTED COLOR," filed on Apr. 2, 1997, by K. L. Baumann et al. and International PCT Application Publication No. WO 98/44384, the disclosures of which are incorporated by reference herein.

First and second transparent substrates 112 and 114 may be any material which is transparent and has sufficient strength to be able to operate in the environmental conditions to which the device will be exposed. Substrates 112 and 114 may comprise any type of borosilicate glass, soda lime glass, float glass, or any other material, such as, for example, MYLAR®, polyvinylidene halides, such as polyvinylidene chloride, a polymer or plastic, such as cyclic olefin copolymers like Topas® available from Ticona, LLC. of Summitt, N.J., that is transparent in the visible region of the electromagnetic spectrum. Substrates 112 and 114 are preferably a sheet of glass. If the device of the present invention is used as a mirror, first substrate 112 preferably meets the operational conditions outlined above, except that it does not need to be transparent, and therefore may comprise polymers, metals, colored or non-transparent glass, and ceramics.

Seal member 120 may be any material that is capable of adhesively bonding the coatings on inner second surface 112b to inner surface 114b to seal the perimeter, such that electrochromic material 124 does not leak from chamber 122. The performance requirements for a perimeter seal member 120 used in an electrochromic device are similar to those for a perimeter seal used in a liquid crystal device (LCD), which are well known in the art. The seal preferably has good adhesion to glass, metals, and metal oxides; preferably has low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Totally hermetic seals, such as those made with glass frit or solder glass, can be used, but the high temperatures (usually near 450° C.) involved in processing this type of seal can cause numerous problems, such as glass substrate warpage, changes in the properties of transparent conductive electrode, and oxidation or degradation of the reflector. Because of their lower processing temperatures, thermoplastic, thermosetting, or UV-curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability, and good solvent resistance, epoxy-based organic sealing resins are preferred. These eposy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage, such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 120 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U405, 24EMI, U410, and U-415 available from CVC Specialty Chemicals, Maple Shade, N.J.; and "AMICURE" PACM, 352, CG, CG-325, and CG1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z6076 available from Dow Corning Corporation, Midland, Mich. Suitable precision glass microbead spacers are available in an assortment of sizes from Duke Scientific, Palo Alto, Calif.

Transparent electrodes 116 and 118, which may be any material which bonds well to second substrate 112, are resistant to corrosion to any materials within the electrochromic device, resistant to corrosion by the atmosphere, have minimal diffuse or specular reflectance, high light transmission, near neutral coloration, and good electrical conductance. Transparent electrodes 116 and 118 may be fluorine-doped tin oxide, doped zinc oxide, zinc-doped indium oxide, tin-doped indium oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent electrodes 116 and 118 will depend on their thickness and composition. IMI generally has superior conductivity compared with the other materials. IMI is, however, known to undergo more rapid environmental degradation and suffer from interlayer delamination. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material 130 may be deposited between transparent electrodes 116 and 118 and the inner surface 112b of substrate 112 to suppress the transmission of any unwanted go portions of the electromagnetic spectrum.

To form the electrode pattern shown in FIG. 3, an entire layer of transparent electrically conductive material may be formed on surface 112b of substrate 112 through known techniques such as sputtering, evaporating, and chemical vapor deposition, and the like, and then the regions thereof corresponding to gap 117 may be removed by etching, such as chemical, laser, or mechanical etching. Alternatively, the pattern may be formed using photolithography, ink jet printing, contact printing, or any other manner known in the art.

When the interdigitated fingers 116a and 118a of electrodes 116 and 118, respectively, are of equal width, the electrochromic device tends to exhibit stripes of alternating color when in a low transmittance state. These stripes are caused by the co-planar relation of the electrodes and by the anodic and cathodic species in electrochromic medium 124 migrating towards the respective electrodes and donating or accepting electrodes and entering their colored states in close proximity to the surfaces of the electrodes. To reduce this effect, the width of the electrode fingers may be decreased, while the number of such fingers may be increased.

To further reduce the visibility of any such striping, the width of the fingers of one electrode may be increased while decreasing the width of the fingers of the other electrode. An example of such an arrangement is shown in FIG. 3. In the example shown, the width of fingers 116a of first electrode 116, which serves as the cathode, is five times wider than fingers 118a of second electrode 118, which serves as the anode. Thus, the ratio of the widths of the fingers of first electrode 116 to the widths of the fingers of the second electrode 118 would be 5:1. Because the surface area of one electrode would thus be five times greater than the surface area of the second electrode, anodic and cathodic species in electrochromic medium 124 would not become reduced or oxidized at the same rates if provided in equal quantities in the electrochromic medium. If the cathode has the larger surface area, the amount of anodic species may be correspondingly increased so as to increase the rate at which the anodic species oxidizes within chamber 122. As is well known in the field of electrochemistry, the current due to an electrochemical process is related to the electrode area and the concentrations and diffusion coefficients of the electroactive components. Commonly assigned U.S. Pat. No. 6,137,620, entitled "ELECTROCHROMIC MEDIUM WITH CONCENTRATION ENHANCED STABILITY, PROCESS FOR PREPARATION THEREOF AND USE IN ELECTROCHROMIC DEVICES," filed on Apr. 30, 1999, by T. Guarr et al., teaches the concept of adjusting the concentrations of the anodic and cathodic materials for optimal device operation. The disclosure of U.S. Pat. No. 6,137,620 is incorporated in its entirety herein by reference. Preferably, the electrochromic medium 124 is adjusted to reflect the changes in electrode area, i.e., a ratio of electrode surface area of 1:2 anode to cathode would result in a ratio of 2:1 anodic to cathodic species change from equal area electrode concentrations. The ratio of anode to cathode surface area and the ratio of cathodic to anodic species are preferably between 20:1 to 1:20, more preferably between 10:1 to 1:10, and even more preferably between 5:1 to 1:5.

Another approach for eliminating or reducing the visibility of any striping is to utilize anodic and cathodic species exhibiting similar color transitions. U.S. Pat. No. 6,020,987, entitled "ELECTROCHROMIC MEDIUM CAPABLE OF PRODUCING PRE-SELECTED COLOR," filed on Apr. 2, 1997, by K. L. Baumann et al. discloses the selection of electroactive components for an electrochromic mirror so as to obtain a perceived color. The disclosure of U.S. Pat. No. 6,020,987 is incorporated in its entirety herein by reference. One example of an electrochromic medium having anodic and cathodic species exhibiting similar color transitions includes a solution of tetra(N-methyl)-p-phenylenediamine (TMPD) and 1,1'-dimethyl-4,4'-bipyridinium bis (tetrafluoroborate) (28 mM each) in propylene carbonate. An electrochromic cell was constructed by creating two electrically isolated conductive areas on a single ITO-coated glass substrate using laser patterning. The patterning consisted of etching an approximately 100 μm wide isolation line in a serpentine arrangement to provide a pair of interdigitated electrodes whose fingers were roughly 2500 μm across. The electrochromic cell was otherwise fabricated in conventional fashion, utilizing the patterned ITO-coated glass substrate as a first substrate, an unpatterned ITO-coated glass plate as a second substrate, and an epoxy seal around the periphery between the two substrates to provide a cell spacing of approximately 137 μm. The cell was filled using a vacuum backfilling technique with the above electrochromic solution. Electrical connection was made to both electrodes of the first substrate (no electrical connection was made to the second, unpatterned substrate). Upon application of 1.2 V DC, the device achieved a fairly blue uniform coloration. The color that developed at the anode was slightly more purple that the royal blue color observed at the cathode., According to a second example, an electrochromic cell was fabricated in the same manner as the above example except that the width of the interdigitated electrode fingers was approximately 5 mm. The device was then filled with a solution of 30 mM 5,10-dimethyl-5,10-dihydrophenazine, 30 mM bis(3,5-dimethylphenyl)4,4'-bipyridinium bis (tetrafluoroborate), 30 mM Tinuvin P, and 3% PMMA in propylene carbonate. Upon application of 1.2 V DC, the device achieved a fairly uniform green coloration. The color at the anode was somewhat less intense than the color developed at the cathode.

Although the colors developing at the anode and the cathode in the above examples were not matched exactly, the closeness of the coloration at the anode and the cathode is sufficient to substantially reduce or eliminate the perceivable striping.

Depending upon the window application, it may also be possible to provide a diffuser on or in the window so as to effectively blur any striping that would otherwise be visible. For example, such a diffuser may be used for skylights incorporating the present invention. If a diffuser layer is utilized, it is preferably provided on a surface of the electrochromic window that is closest to the viewer. Alternatively, the surface of the window closest to the viewer may be roughened so as to provide a diffuser directly in the surface on the electrochromic device.

It should be noted that the electrode pattern illustrated in FIGS. 3 through 5 is not drawn to scale, but is enlarged to more clearly illustrate the concepts of the present invention. For a 5:1 electrode surface area ratio, the width of the electrode fingers 116a and 116b is preferably sufficient to provide the selected ratio while providing a gap 117 between the electrodes of sufficient width so as to electrically isolate the electrodes from one another. The thickness of electrodes 116 and 118 is preferably sufficient to provide a sheet resistivity of preferably less than about 100 Ω/ε, more preferably less than about 40 Ω/□, and even more preferably less than about 20 Ω/□. Clearly, the electrodes may have various dimensions, particularly when ratios of 10:1 or even 20:1 are used and the electrode patterns are not limited to the specific pattern illustrated in FIG. 3. Thus, first and second electrodes 116 and 118 may have any pattern, provided they are electrically separated from one another. Preferably, the pattern utilized provides for perceived uniform coloring of the electrochromic medium. It should also be noted a that the perceived visibility of any striping will depend upon the electrode finger widths relative to the distance a viewer is from the electrochromic window as well as the color separation of the anodic and cathodic species. For example, a skylight or a window mounted high above the floor may not exhibit striping while a window having the same electrode finger widths that is located where viewers may closely approach the window may exhibit more considerable striping. Thus, it will be appreciated that the width of the electrode fingers may vary considerably.

By providing both electrodes 116 and 118 on the inner surface of a single substrate, all the coloration of the anodic and cathodic species occurs at (or near) the surface on which electrodes 116 and 118 are provided. Thus, any UV radiation entering chamber 122 via substrate 114 may be absorbed by a UV absorbing material provided in chamber 122 before the UV radiation reaches the colored anodic and cathodic species of the electrochromic material. Thus, the UV absorbing material is much more effective, and the electrochromic device will exhibit a much greater lifetime. To further reduce the possibility that UV radiation may reach the colored species in electrochromic material 124, a UV reflective or absorbing material or film stack may be applied to outer surface 114a or inner surface 114b of substrate 114.

Figure 1:
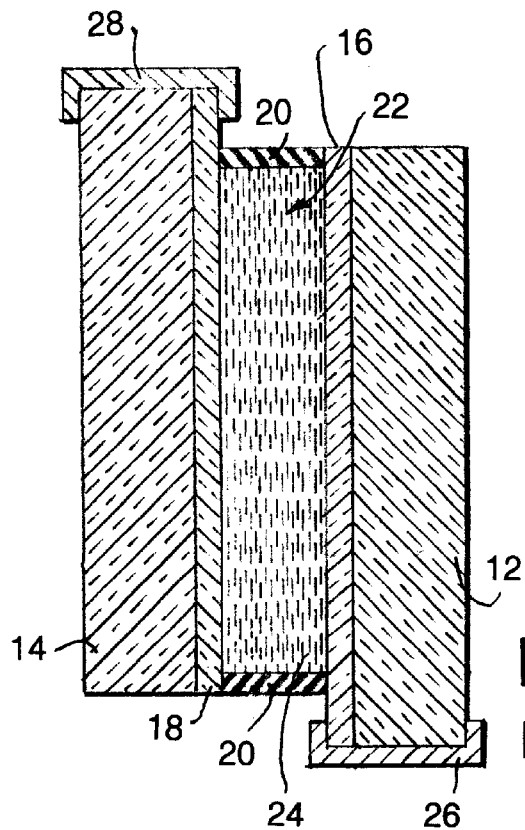
FIG. 1 is a cross-sectional view of a first conventional electrochromic device.

Another advantage to providing both the first and second electrodes on a single surface of one of the substrates is that this electrode configuration enables the electrochromic device to be operated at a much lower current. Prior constructions, such as that shown in FIG. 1, may draw around 50 to 60 mA when a potential of 1.0 to 1.2 volts is applied between the electrodes. This current varies based on the size of the electrochromic device as well as other parameters such as the concentrations and diffusion coefficients of the electroactive materials. By placing both electrodes on a single surface, an electrochromic device may be constructed that draws as little as 2 mA when a potential of 1.0 to 1.2 volts is applied between the electrodes. Such a reduction in the current draw represents a very significant improvement, particularly when such a structure is implemented in the architectural windows of a large building.

In addition to the advantages noted above, providing both electrodes on a single surface of a single substrate also provides for a higher tolerance level for substrates having surfaces that are not perfectly smooth or flat. Thus, tempered glass may be used as one or both of the substrates without adversely affecting the spacings between the electrodes. Yet another advantage to providing both the electrodes on the surface of a single substrate is that the other substrate need not be selected of materials that are conducive to the deposition of electrode materials. Thus, substrate 114 may be formed of a wide variety of materials, such as plastic.

Further, because only one of the substrates needs to be coated with the electrode material, the cost for producing the electrochromic device may be reduced. Also, the distance between substrates 114 and 112 becomes less critical and the substrates may be spaced closer together, thereby reducing the overall thickness of the electrochromic device and decreasing the amount of materials required to fill chamber 122. Additionally, the electrode arrangement provides for less segregation of the electroactive materials in electrochromic medium 124 than is present in devices having conventional electrode arrangements.

FIGS. 6 through 9 show an electrochromic device 200 constructed in accordance with a second embodiment of the present invention. Like the first embodiment, the second embodiment provides both first and second electrodes carried on the inner surface of substrate 112. Unlike the first embodiment, however, first and second electrodes 216 and 218 are not disposed in a coplanar manner on inner surface 112b, but rather are arranged in a stacked configuration. To prevent electrical shorting, a dielectric or other insulating layer 220 is provided between electrodes 216 and 218. To allow the electrochromic medium to come into contact with electrode 216, a plurality of apertures 225 such as pores and/or perforations are made through both electrode 218 and dielectric layer 220. The apertures in electrode 218 and the apertures in layer 220 are in communication with one another so that the electrochromic medium may fill perforations 225 and reach portions of electrode 216.

Layers 216, 218, and 220 may be formed on surface 112$b$ of substrate 112 by photolithography, screen or ink jet printing of dielectric and conductive inks, providing continuous coatings of each layer and then utilizing laser ablation to form the perforations through the top two layers of the stack, sputtering the materials onto the substrate through a mask or sputtering onto a continuous conductor layer having a perforated insulator stack already provided thereon, chemical vapor deposition, or by laser-assisted chemical deposition. Depending upon the size spacing, number of apertures 225, and the thicknesses of electrode 218 and dielectric layer 220, the ratio of the exposed surface areas of the two electrodes may fall in the range of 10:1 to 1:10. As discussed above, the ratio of anodic to cathodic species in the electrochromic medium may be varied to compensate for the variation in exposed electrode surface areas. For example, apertures 225 may have a diameter of 1 mm and be formed 250 $\mu$m apart in a close-packed repetitive pattern. The dimensions of electrode layers 216 and 218 are selected to obtain a sheet resistivity of preferably less than about 100 $\Omega/\square$, more preferably less than about 40 $\Omega/\square$, and even more preferably less than about 20 $\Omega/\square$, and the thickness of dielectric layer 220 is selected to provide enough electrical isolation between the electrodes. Electrode layers 216 and 218 may be formed of any conventional electrically transparent material commonly used in such electrochromic devices, while dielectric layer 220 may be formed of any transparent dielectric material and is preferably formed of silicon dioxide, zinc oxide, and other materials known in the art due to their inert characteristics relative to the electrochromic material. Dielectric layer 220 may also be formed using an adhesive used to attach electrode layer 218 to electrode layer 216 or may be formed of a porous material such that its pores function as apertures 225.

FIGS. 10 and 11 show an electrochromic device 300 constructed in accordance with a third embodiment of the present invention. Electrochromic device 300 differs from electrochromic device 200 in that electrode layer 218 is replaced with a layer of a fine metal mesh 318. Mesh layer 318 is formed of nickel, gold, INCONEL®, copper, etc. with sufficiently fine strands so as to not adversely affect the image viewed through the electrochromic device. Dielectric layer 220 may be formed of any porous transparent dielectric material and need not have perforations that are registered with any openings in the mesh layer 318. Thus, dielectric layer 220 may be formed using a NUCLEPORE® membrane available from Corning Incorporated of Corning, N.Y.

Figure 2:
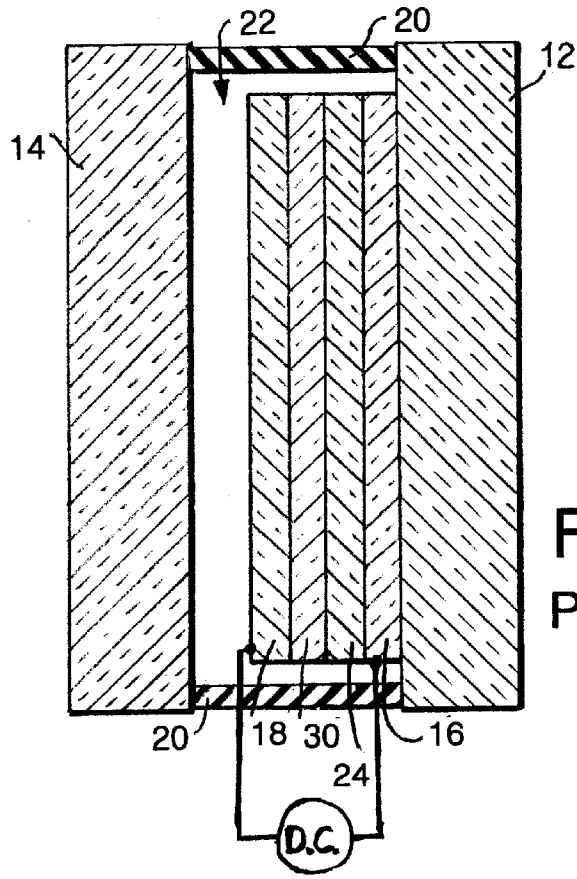
FIG. 2 is a cross-sectional view of a second conventional electrochromic device.

Electrochromic devices 200 and 300 of the second and third embodiments provide much of the same advantages as the first embodiment. Unlike the conventional electrochromic device shown in FIG. 2, the electrochromic material is not solely confined between the two electrode layers along the sight line of a person looking through the device. Thus, the second and third embodiments of the present invention allow for use of a solution-phase electrochromic material or even a hybrid system incorporating a solid-state electrochromic material and solution-phase electrolyte.

While a specific structure is shown in the drawings and described above, it will be appreciated by those skilled in the art that the inventive electrode design may be incorporated in windows and other devices having different structures. For example, an electrochromic window incorporating the inventive electrode design could be constructed that also incorporates a photovoltaic device to provide power to the electrochromic window. The disclosure of commonly assigned U.S. Pat. No. 6,045,643, entitled "ELECTRO-OPTIC WINDOW INCORPORATING A DISCRETE PHOTOVOLTAIC DEVICE AND APPARATUS FOR MAKING SAME," filed on Jan. 26, 1996, by Harlan Byker et al., is incorporated by reference herein.

Although the above invention has been described with reference to use in an architectural window, it will be appreciated by those skilled in the art that the above constructions could similarly be used in an electrochromic mirror, such as the type used for rearview mirrors in a vehicle. To construct the device as a mirror, a reflective layer could be applied to outer surface 112$a$ of substrate 112, or the electrodes could be formed with a reflective and electrically conductive material. Alternatively, transparent electrodes could be formed over or under a metallic reflective coating.

An electrochromic device using a component including the electrode design of the present invention can be easily made part of an insulated glass (IG) unit. As shown in FIGS. 12A and 12B, an IG unit 400 typically has two panes of glass 402 and 404 sealably bonded together in spaced-apart relation to define a chamber therebetween. IG unit 400 further includes a layer of low heat conducting gas 406, such as argon, in the chamber. As shown in FIG. 12A, an electrochromic device 407 can be incorporated by applying a substrate 410 carrying first and second electrodes 412 and 414, respectively, and an electrochromic medium 408 to one of panes 402 and 404. First and second electrodes 412 and 414 include first surfaces 412$a$ and 414$a$ facing substrate 410, and second surfaces 412$b$ and 414$b$ opposite the first surfaces. Electrochromic medium 408 is disposed over the second surfaces of first and second electrodes 412 and 414 in electrical contact therewith. In addition to substrate 410, electrochromic device 407 may include a second substrate 411 provided to keep separation between electrochromic medium 408 and the low heat conducting gas 406 or to maintain a solution-phase electrochromic medium in a chamber formed between substrates 410 and 411.

Alternatively, as shown in FIG. 12B, the electrode design could be incorporated into one of the panes and the electrochromic medium is disposed thereon. Insulated units can further carry additional layers 416 and 418 such as UV absorbing/blocking layers, an IR reflecting/blocking layer, a low-E layer, a third pane, etc. Layers 416 and 418 may be carried on a front surface 402$a$ or rear surface 402$b$ of glass 402 or on a front surface 411$a$ or rear surface 411$b$ of second substrate 411. Layers 416 and 418 may be carried on the same surface or on different surfaces of the same or different elements. Electrochromic materials exhibiting near infrared absorbence as is described in U.S. Pat. No. 6,193,912 are especially useful in devices in windows of this design. The entire disclosure of U.S. Pat. No. 6,193,912 is incorporated herein by reference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of The invention, which is defined by the following claims as interpreted according to the principles of patent law, including the doctrine of equivalents.

The invention claimed is:

1. An electrochromic device comprising:
   a transparent first substrate having an outer surface and an inner surface;
   a second substrate having an inner surface spaced apart from said inner surface of said first substrate;
   a perimeter seal, which, with said inner surfaces of said first and second substrates, defines a chamber therebetween;
   a first electrode carried on said inner surface of said second substrate;
   a second electrode also carried on said inner surface of said second substrate, said second electrode being electrically isolated from said first electrode;
   a UV radiation attenuating material associated with said device; and
   an electrochromic medium disposed in said chamber between said inner surface of said first substrate and said inner surface of said second substrate, wherein said UV radiation attenuating material reduces the amount of UV radiation impacting a portion of said electrochromic medium.

2. The electrochromic device of claim 1, wherein said UV radiation attenuating material is provided in said chamber.

3. The electrochromic device of claim 1, wherein said UV radiation attenuating material is provided on a surface of said first substrate.

4. The electrochromic device of claim 3, wherein said UV radiation attenuating material is provided in a film applied to a surface of said first substrate.

5. The electrochromic device of claim 1, wherein said first and second electrodes are substantially coplanar.

6. The electrochromic device of claim 1, wherein said electrochromic medium includes cathodic and anodic species, wherein the ratio of cathodic to anodic species within said in electrochromic medium is a function of the ratio of the surface areas of said first electrode and said second electrode.

7. The electrochromic device of claim 1, wherein said electrochromic medium includes anodic and cathodic species exhibiting substantially similar color transitions.

8. The electrochromic device of claim 1, wherein said electrochromic device is a mirror.

9. A window comprising the electrochromic device of claim 1.

10. The window of claim 9 and further including a window pane, wherein said UV attenuating material is carried on a surface of said window pane.

11. An electrochromic device comprising:
    a transparent first substrate having an outer surface and an inner surface;
    a second substrate having an inner surface spaced apart from said inner surface of said first substrate;
    a perimeter seal, which, with said inner surfaces of said first and second substrates, defines a chamber therebetween;
    a first electrode carried on said inner surface of said second substrate;
    a second electrode also carried on said inner surface of said second substrate, said second electrode being electrically isolated from said first electrode, wherein said second electrode comprises a series of conductive members that are electrically isolated from one another; and
    an electrochromic medium disposed in said chamber between said inner surface of said first substrate and said inner surface of said second substrate.

12. The electrochromic device of claim 11, wherein said second electrode further comprising a contact strip electrically coupled to each of said series of conductive members.

13. The electrochromic device of claim 11 and further including a UV attenuator associated with said device.

14. The electrochromic device of claim 11, wherein said first and second electrodes are substantially coplanar.

15. The electrochromic device of claim 11, wherein said electrochromic medium includes cathodic and anodic species, wherein the ratio of cathodic to anodic species within said electrochromic medium is a function of the ratio of the surface areas of said first electrode and said second electrode.

16. The electrochromic device of claim 11, wherein said electrochromic medium includes anodic and cathodic species exhibiting substantially similar color transitions.

17. The electrochromic device as defined in claim 11, wherein said device is configured such that said electrochromic medium becomes colored when a current flows through said first and second electrodes.

18. The electrochromic device as defined in claim 11, wherein said electrochromic medium comprises a cathodic and anodic species.

19. An insulated glass window comprising:
    a first glass pane;
    a second glass pane sealably bonded to said first glass pane to define a chamber therebetween;
    a low heat conducting gas provided in said chamber; and
    an electrochromic device disposed within said chamber, said electrochromic device comprising:
      first and second electrodes carried on a single surface of a substrate, said first and second electrodes being electrically isolated from one another, each electrode having a first surface facing the substrate, and a second surface opposite said first surface, wherein said first and second electrodes are substantially coplanar; and
      an electrochromic medium in electrical contact with said first and second electrodes.

20. The insulated glass window of claim 19, wherein said second glass pane functions as said substrate.

21. The insulated glass window of claim 19, wherein said electrochromic medium is disposed over said second surfaces of said first and second electrodes.

22. The insulated glass window of claim 19, wherein said substrate is attached to a surface of one of said first and second glass panes within said chamber.

23. The insulated glass window of claim 19, wherein said electrochromic element includes a second substrate spaced apart from the other substrate, which, with a seal, defines a sealed second chamber therebetween, said electrochromic medium being disposed in said second chamber.

24. The insulated glass window of claim 23, wherein said second substrate is spaced apart from said first and second glass panes.

25. An insulated glass window comprising a first glass pane;
    a second glass pane sealably bonded to said first glass pane to define a chamber therebetween;
    a low heat conducting gas provided in said chamber; and
    an electrochromic device disposed within said chamber, said electrochromic device comprising:
      first and second electrodes carried on a single surface of a substrate, said first and second electrodes being electrically isolated from one another, each electrode having a first surface facing the substrate, and a second surface opposite said first surface; and an electrochromic medium in electrical contact with said first and second electrodes and further including an ultraviolet attenuator carried on a surface of one of said first glass pane and said electrochromic device.

26. An electrochromic mirror comprising:

a transparent first substrate having an outer surface and an inner surface;

a second substrate having an inner surface spaced apart from said inner surface of said first substrate, which, with a seal, defines a chamber therebetween;

a first electrode carried on said inner surface of said second substrate;

a second electrode also carried on said inner surface of said second substrate, said second electrode being electrically isolated from said first electrode;

an electrochromic medium disposed in said chamber between said inner surface of said first substrate and said inner surface of said second substrate, which carries said first and second electrodes; and a reflector provided on a surface of said second substrate.

27. The electrochromic mirror of claim 26, wherein said reflector is provided on an outer surface of said second substrate.

28. The electrochromic mirror of claim 26, wherein said reflector is provided on said inner surface of said second substrate.

29. The electrochromic mirror of claim 28, wherein said reflector includes an electrically conductive layer that functions as said second electrode.

* * * * *